Patented July 2, 1946

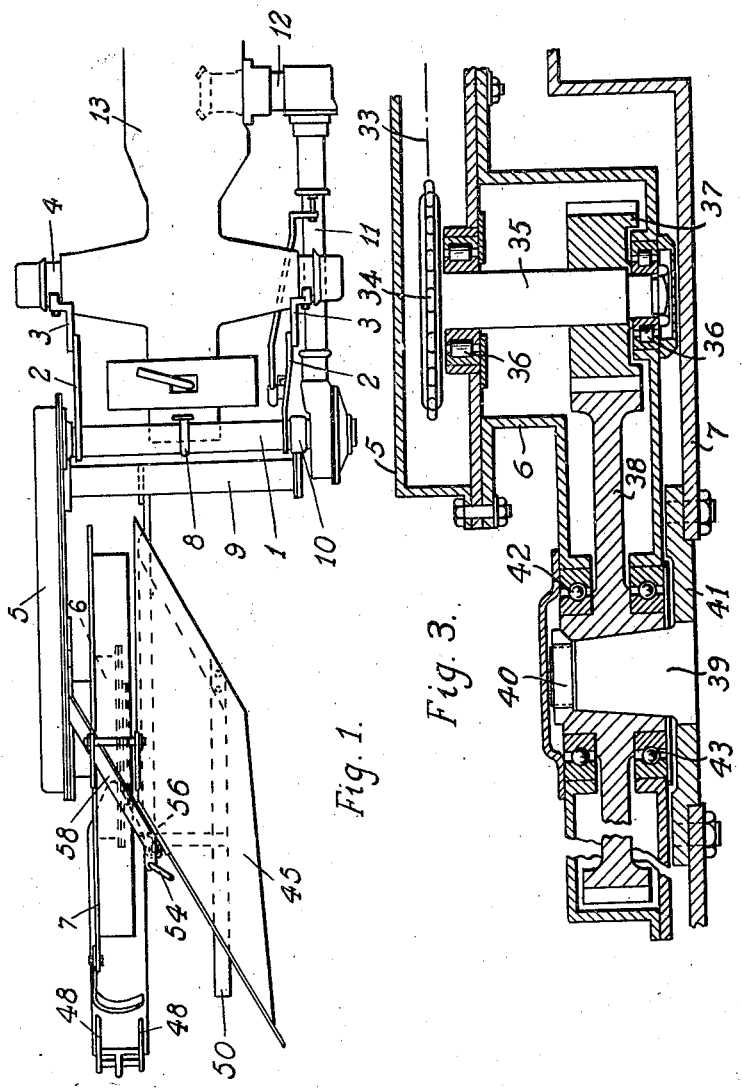

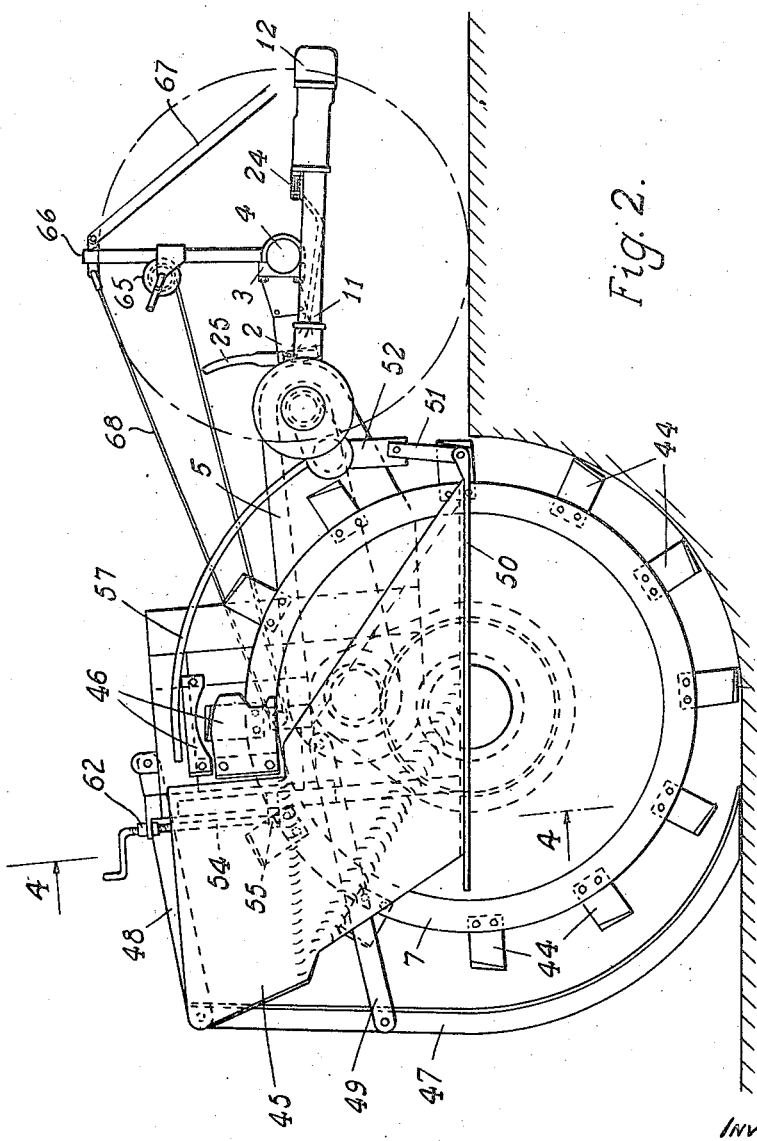

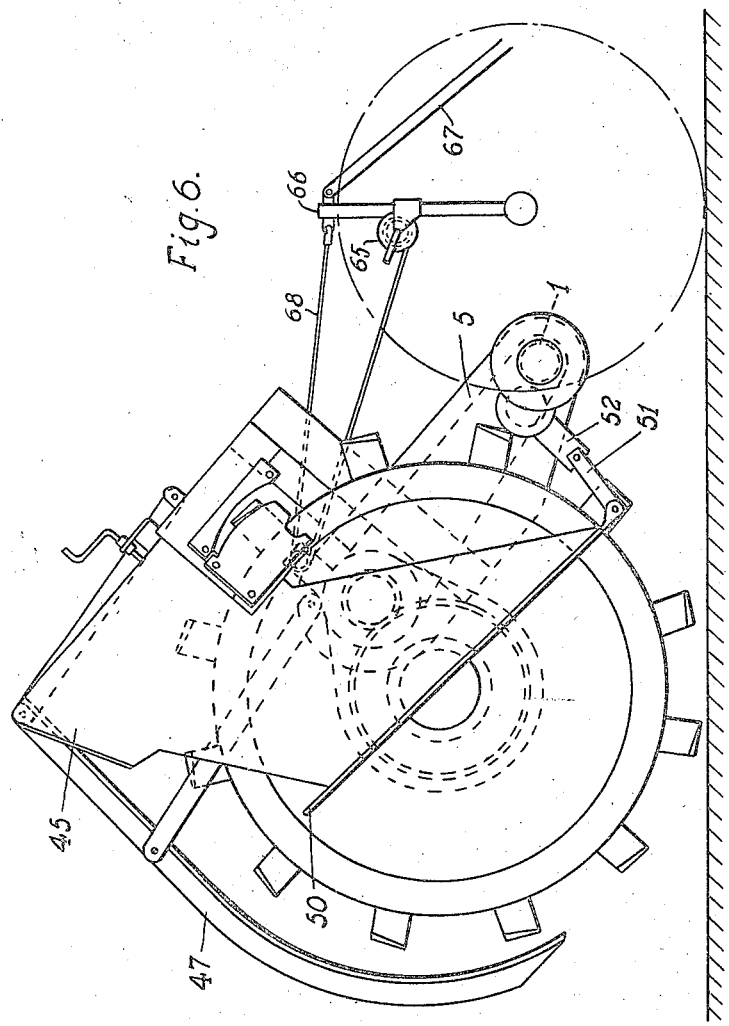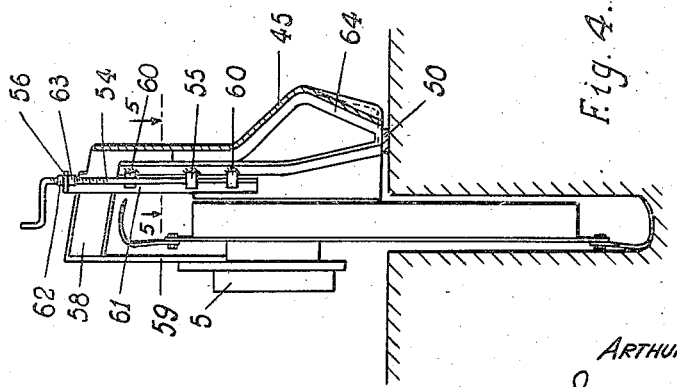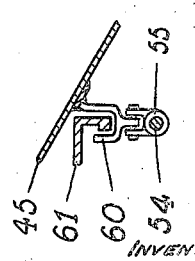

2,403,367

UNITED STATES PATENT OFFICE 2,403,367

TRENCH DIGGING MACHINE

Arthur Clifford Howard, Upminster, England

Application June 7, 1943, Serial No. 489,969
In Great Britain May 21, 1942

9 Claims. (Cl. 37—94)

This invention relates to trench digging machines and has for its object to provide a machine for digging trenches for the laying of agricultural drain pipes, electric cables, for irrigation, or for other purposes. Another object of the present invention is to provide such a machine that will deposit the earth removed during the making of the trench at one side so as to leave it in readiness for filling-in after the pipe, cable, or the like has been laid. A still further object is so to construct such a machine that it can be fitted to and operated by a tractor. Other objects will transpire from the following description.

A trench digging machine according to this invention comprises a frame adapted for attachment to a tractor, a wheel provided with peripheral digging tools supported in said frame, a drive transmission for said digging wheel adapted to be driven from the tractor power take-off shaft, a clutch incorporated in said transmission, means for controlling the depth of operation of said digging wheel, means for stripping the sods from the digging wheel tools and a mould board for depositing them at the side of the trench. In some cases the machine may be provided with a lifting device for raising and maintaining the digging wheel out of contact with the ground. Also, the machine may be provided with a collector adapted to accumulate loose earth in the bottom of the trench and to feed it on to the digging tools so as to cause it to be removed from the trench.

The trench digging machine may be constructed so that the digging wheel is rotated in the same sense as the tractor driving wheels, or in the reverse sense. In some instances, the gearing may incorporate a reverse gear so that the digging wheel may be driven in either direction, the digging tools being changed as necessary. When the digging wheel is driven in the reverse sense to the tractor driving wheels it is possible to dig deeper than when the opposite is the case, as the undercutting action of the digging tools draws the digging wheel downwards to an extent which is only limited by the setting of the depth controlling means.

The digging machine may be driven by a spiral bevel wheel from the power take-off gear of the tractor, and this bevel wheel may drive a longitudinal shaft, incorporating a dog clutch, from the front through a bevel gear box secured to the tractor. The rear of the longitudinal shaft drives one end of a cross-shaft on the digging machine frame through bevel gearing, and the other end of the cross-shaft is connected, preferably by a driving chain, to a shaft carrying a spur gear which meshes with a driven gear on the digging wheel shaft. The mechanism is preferably encased to protect it from flying earth and dust.

The digging tools may consist of plates with laterally projecting portions set with the leading edge at a greater distance from the axis of rotation of the wheel than the trailing edge so as to be adapted to cut and lift the sods, and the frame is provided with a slot backed by adjustable stripping plates through which the digging tools pass after leaving the ground, for the purpose of stripping the tools of the sods and directing them onto the mould board.

The lifting device may comprise a winch carrying a chain or cable connected to the rear of the digging machine. This winch is preferably supported at the top of a Samson post on the tractor, and the Samson post may be supported by a strut connected to the tractor gear case.

The digging machine may be provided with a two-wheeled or other suitable carriage, for transportation over road surfaces.

The depth control means may comprise one or more skids so disposed on the frame that they run on one or each side of the trench, and provided with a depth regulating screw or a series of holes that can be secured to anchorages on the frame or in any other convenient position by bolts in alternative positions so that the machine can be set to dig trenches of different depths.

A guard may be secured above the digging wheel to protect the operator from flying clods of earth.

One form of trench digging machine according to the present invention, particularly adapted for use with a standard Fordson tractor fitted with a travel speed reduction gear box, comprises a frame with a transverse tubular member with arms for bolting to brackets on the tractor rear axle housing. The tubular member carries a rearwardly directed chain case at one side, and the rear of the chain case carries a gear case which houses the bearings and axle for the digging wheel. The tubular frame member is adapted to be secured by any suitable means to the tractor, and is braced by a transverse member connected to the chain case at one end and by an arm to the tubular member at the other. The end of the tubular member remote from the chain case carries a forwardly directed tubular casing connected by a bevel gear housing to the tractor crank case. A drive shaft supported in ball bearings in the bevel gear housing, carries a spiral bevel gear at its inner end which meshes with the power take-off gear of the tractor, and carries a bevel gear at its outer end which meshes with a bevel wheel on a transmission shaft supported on ball bearings and located within the forwardly directed tubular casing. The transmission shaft has a dog clutch intermediate its ends, and carries a bevel gear at the rear which meshes with a bevel wheel on a cross-shaft within the tubular member. The cross-shaft is supported on ball bearings, and carries at the end opposite to the bevel wheel, a chain sprocket connected by a driving chain to a driven sprocket on a shaft within the gear case. The driven sprocket shaft is supported in ball bearings within the gear case and carries a spur gear at its opposite end which meshes with a spur wheel on the digging wheel axle.

The digging wheel comprises a disc bolted to a flange on the shaft, and has a drum-like felloe on one side having a radial flange to which the digging tools are bolted. The digging tools are L-shaped plates the horizontal portions of which extend into the zone of the drum, and are set at an angle so as to cut and lift the sods to a point above ground level.

The mould board is supported on the frame in any suitable manner and in such a position that when the digging tools pass between a pair of adjustable stripping plates secured to the frame, the sods are stripped off and deflected onto the ground at the side of the trench.

In order that the invention may be more clearly understood it will now be more particularly described with reference to the accompanying drawings, in which—

Fig. 1 is a plan view of one form of trench digging machine according to this invention attached to the rear of a tractor, Fig. 2 is a side elevation corresponding with Fig. 1, showing the machine digging a trench, Fig. 3 is a detail view showing how the digging wheel is supported;

Figure 4 is a cross-section on the line 4—4 of Figure 2 showing the adjustable support for the rear of the mould board;

Figure 5 is a cross-section on the line 5—5 of Figure 4, and

Figure 6 is a view similar to Figure 2 but showing the digging wheel raised clear of the ground.

Referring now to Figs. 1 and 2 of the drawings, the frame has a transverse tubular member 1 with arms 2 for bolting to brackets 3 on the tractor rear axle housing 4. The tubular member 1 carries a rearwardly directed chain case 5 at one side, and the rear of the chain case carries a gear case 6 which houses the bearings and axle for the digging wheel 7. The tubular member 1 is secured to the tractor by the clamp 8, and a transverse bracing member 9 connected to the member 1 by an arm 10 at one end, is connected at the other end to the chain case 5 so as to steady it. The end of the member 1 opposite to the chain case carries a forwardly directed tubular casing 11 connected by a bevel gear housing 12 to the tractor gear case 13 around the power take-off shaft opening. The digging wheel is driven by the tractor power take-off shaft through geared shafts within the casing 11, the member 1, a chain within the casing 5, and gearing within the case 6.

A driving chain, indicated by the dotted line 33, drives a sprocket 34 on a shaft 35 within the gear case 6. The shaft 35 is supported in roller bearings 36, see Fig. 3, and carries a spur gear 37 which meshes with a spur gear 38 on the digging wheel axle 39. The gear 38 is held on a tapered portion of the axle 39 by a nut 40, and the axle 39 has a flange 41 to which the digging wheel 7 is bolted. The gear 38 is supported in ball bearings 42 and 43. The digging tools 44 are in the form of L-shaped plates bolted to the wheel 7, and are set so that their leading edges are further from the centre of the wheel 7 than their trailing edges, the wheel 7 being driven in a counter-clockwise direction in Fig. 2.

An oblique frame member 58 is secured to an upright 59 fixed to the chain case 5, and carries a pair of stripping plates 46 between which the digging tools 44 pass so as to be stripped of their sods. The earth thus removed from the digging tools is received on a mould board which deposits it at the side of the trench being dug.

The mould board 45 is pivoted to a strap 51 hinged to an arm 52 secured to the transverse bracing member 9 at the front, and is connected at the rear to depth control means supported by the oblique frame member 58. The rear of the mould board is retained against lateral displacement by three hook members 60 which enclose a flange on a downward extension 61 of the oblique frame member 58.

The depth control means comprises a rod 54 screwed into a nut 62 secured to a bracket 56 on the oblique frame member 58. The lower portion of the rod 54 is received within a step bearing 55 pivoted to the central hook member 60 of the mould board 45. By these means, when the crank handle at the top of the rod 54 is turned, the height of the mould board with respect to the digging wheel is adjusted whilst the meeting surfaces of the mould board and frame member 61 are maintained in contact.

The mould board shown is made from thin sheet metal secured to a frame 64 to which the strap 51 and the hook members 60 are secured. A skid 50 is secured to the frame member 64 at the front and back, and is so disposed as to track a sufficient distance from the trench as to avoid breaking in the edges.

A collector 47 is freely supported on parallel links 48 and 49 pivoted to the frame member 58, and has a shoe which runs along the bottom of the trench as it is formed so as to accumulate loose earth and cause it to be picked up by the digging tools.

A hood 57 is secured in any suitable manner to the frame member 58 and to the transverse bracing member 9 so as to protect the machine operator from flying earth.

The entire transmission is enclosed in casings to prevent the increase of dirt.

It will be seen that the machine as above described comprises a rigid structure consisting of the tubular member 1, the bracing member 9, the chain case 5, and the frame members 58, 59 and 61. This rigid structure supports the digging wheel, mould board and skid, and the collector 47 in a manner to enable them to be pivoted as an assembly about the axis of the tubular member 1. A lifting device may be provided for raising the digging wheel, mould board, and collector clear of the ground so that the machine may be transported on roads by its associated tractor. This lifting device may consist of a winch 65, see Figs. 2 and 6, supported on a Samson post 66 secured to the transverse tubular member 1 and connected by a stay 67 to the back axle of the tractor. One end of a chain or cable 68 is secured to the winch, and after the cable has been passed around a pulley 69 mounted in a bracket on the chain case 5, the other end is secured to the Samson post. The winch is provided with any suitable type of ratchet and pawl device.

The machine illustrated is so constructed that the digging wheel rotates in the reverse sense to the tractor driving wheels, and in operation, with the clutch engaged, the digging tools cut the sods and lift them to a point where they are stripped off by the stripping plates and the mould board deflects them to the side of the trench.

It has been found that satisfactory results are obtained with a digging machine according to this invention when cutting a trench 6 in. wide by 36 in. deep, if the tractor reduction gear gives a speed of travel of 0.25 mile per hour, and the digging wheel is provided with 12 equi-spaced tools and driven by the gearing at 65 revolutions per minute in the reverse sense to the tractor driving wheels. These details are illustrative only, and will be varied according to the class of work required and the nature of the ground operated upon.

The above details of construction have been given purely by way of example, and it is intended that they may be varied without departing from the scope of the present invention.

I claim:

1. In a trench digging machine of the type having a frame adapted for connection to a tractor, a wheel provided with peripheral digging tools supported in the frame, a drive transmission for said digging wheel acting to drive the bottom of the wheel in the direction of travel of the machine, means contacting the ground at a side of the ditch for controlling the depth of operation of said digging wheel, means for stripping the sods from the digging wheel tools, and a mould board having its lower edge mounted to travel closely adjacent the surface of the ground at an angle to the direction of travel for depositing the sods at the side of the trench.

2. In a trench digging machine of the type having a frame adapted for connection to a tractor, a wheel provided with peripheral digging tools supported in the frame, a drive transmission for said digging wheel acting to drive the bottom of the wheel in the direction of travel of the machine, means contacting the ground at a side of the ditch for controlling the depth of operation of said digging wheel, means for stripping the sods from the digging wheel tools, a mould board having its lower edge mounted to travel closely adjacent the surface of the ground at an angle to the direction of travel for depositing the sods at the side of the trench, and a lifting device for raising and maintaining the digging wheel out of contact with the ground.

3. In a trench digging machine of the type having a frame adapted for connection to a tractor, a wheel provided with peripheral digging tools supported in the frame, a drive transmission for said digging wheel acting to drive the bottom of the wheel in the direction of travel of the machine, means contacting the ground at a side of the ditch for controlling the depth of operation of said digging wheel, means for stripping the sods from the digging wheel tools, a mould board having its lower edge mounted to travel closely adjacent the surface of the ground at an angle to the direction of travel for depositing the sods at the side of the trench, and a collector adapted to accumulate loose earth in the bottom of the trench and feed it on to the digging tools for lifting out of the trench.

4. In a trench digging machine of the type having a frame adapted for connection to a tractor, a disc-like digging wheel having peripherally arranged digging tools rigid with the disc thereof with laterally projecting portions set with the leading edge at a greater distance from the axis of rotation than the trailing edge supported in the frame, a drive transmission for said digging wheel acting to drive the bottom of the wheel in the direction of motion of the machine, means for controlling the depth of operation of said digging wheel, a stripping means secured to said frame through which the laterally projecting portions of the digging tools pass during rotation of the digging wheel so that the sods are stripped from said tools, and a mould board for depositing the sods at the side of the trench.

5. In a trench digging machine of the type having a frame adapted for connection to a tractor, a wheel provided with peripheral digging tools supported in the frame, a drive transmission for said digging wheels, means for stripping the sods from the digging wheel tools, a mould board for depositing the sods at the side of the trench, a skid rigid with the mould board, pivotally secured at the leading end to a forward part of the frame and adjustably connected to a rearward part of the frame so that the depth of operation of the digging wheel is controlled by the condition of adjustment of the skid.

6. In a trench digging machine of the type having a frame adapted for connection to a tractor, a wheel provided with peripheral digging tools supported in the frame, a drive transmission for said digging wheel, means for stripping the sods from the digging wheel tools, a mould board for depositing the sods at the side of the trench, a skid rigid with the mould board, pivotally secured at the leading end to a forward part of the frame, a screwed rod supported in a step bearing associated with the rearward end of the skid, a nut through which said screwed rod passes secured to the frame, and a crank handle on said rod by which it can be turned to adjust the depth of operation of the digging wheel.

7. In a trench digging machine of the type having a frame adapted for connection to a tractor, a wheel provided with peripheral digging tools supported in the frame, a drive transmission for said digging wheel, means for controlling the depth of operation of said digging wheel, means for stripping the sods from the digging wheel tools, a mould board rigid with the depth controlling means for depositing the sods at the side of the trench, a Samson post on the tractor, a winch with a ratchet and pawl control supported at the top of said Samson post, and a cable trained about said winch and secured to the rear of the frame so as to enable the digging wheel to be raised above ground level or lowered into its operative position.

8. A trench digging machine comprising a frame adapted for connection to the driving wheel axles of a tractor, a disc-like digging wheel having peripherally arranged digging tools with laterally projecting portions set with the leading edge at a greater distance from the axis of rotation than the trailing edge supported in said frame, a cross-shaft at the front of said frame, drive transmission means connecting said cross-shaft with the power take-off gear at the side of the tractor, a sprocket and chain connection between the opposite end of said cross-shaft and a shaft geared to the digging wheel axle, a dog clutch in said transmission means, casings enclosing the drive transmission means, cross-shaft, chain and sprocket drive, and the digging wheel axle with its associated gearing so as to prevent the ingress of dirt, a stripping means for stripping the sods from the digging wheel tools, and a mould board for depositing the sods at the side of the trench, a skid rigid with the mould board, pivotally secured at the leading end to a forward part of the frame, a screwed rod supported in a step bearing associated with the rearward end of the skid, a nut through which said screwed rod passes secured to the frame, a crank handle on said rod by which it can be turned to adjust the depth of operation of the digging wheel, and a collector adapted to accumulate loose earth in the bottom of the trench and feed it on to the digging tools for lifting out of the trench.

9. In a trench digging machine of the type having a frame adapted for connection to a tractor, a disc-like digging wheel having peripherally arranged digging tools with laterally projecting portions seat with the leading edge at a greater distance from the axis of rotation than the trailing edge supported in the frame, a drive transmission for said digging wheel, means for controlling the depth of operation of said digging wheel, a mould board secured to said frame, a pair of adjustable stripping plates secured to said frame and between which the laterally projecting portions of the digging tools pass during rotation of the digging wheel so that the sods are stripped from said tools and deposited by the mould board at the side of the trench.

ARTHUR CLIFFORD HOWARD.